(12) United States Patent
Kim et al.

(10) Patent No.: US 8,902,925 B2
(45) Date of Patent: Dec. 2, 2014

(54) FORWARD ERROR CORRECTION DECODER

(75) Inventors: Seuk B. Kim, Plano, TX (US); Douglas E. Wente, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 130 days.

(21) Appl. No.: 13/461,466

(22) Filed: May 1, 2012

(65) Prior Publication Data

US 2013/0294459 A1    Nov. 7, 2013

(51) Int. Cl.
*H04J 3/06* (2006.01)
(52) U.S. Cl.
USPC .................. 370/465; 714/775; 714/785
(58) Field of Classification Search
None
See application file for complete search history.

(56) References Cited

U.S. PATENT DOCUMENTS

| 7,499,500 | B2 | 3/2009 | Page |
| 7,873,892 | B2 | 1/2011 | Ganga et al. |
| 8,108,756 | B2 | 1/2012 | Ganga et al. |
| 2009/0002382 | A1* | 1/2009 | Hirahara ..................... 345/522 |
| 2009/0276681 | A1 | 11/2009 | Ou et al. |
| 2010/0095185 | A1 | 4/2010 | Ganga et al. |
| 2010/0122141 | A1* | 5/2010 | Arye .............................. 714/752 |
| 2010/0125776 | A1* | 5/2010 | Mutchnik et al. ............. 714/785 |
| 2010/0229067 | A1 | 9/2010 | Ganga et al. |
| 2011/0078545 | A1* | 3/2011 | He et al. ........................ 714/775 |
| 2012/0179950 | A1* | 7/2012 | He et al. ........................ 714/752 |

OTHER PUBLICATIONS

"IEEE Standard 802.3ap-2007: Carrier Sense Multiple Access with Collision Detection (CSMA/CD) Access Method and Physical Layer Specifications, Amendment 4: Ethernet Operation over Electrical Backplanes," IEEE-SA Standards Board, Mar. 22, 2007.
Amendment to IEEE Std 802.Mar. 2008, clause 74.
"IEEE Standard 802.3-2008," sections 1-5, Dec. 26, 2008.

* cited by examiner

*Primary Examiner* — Huy D Vu
*Assistant Examiner* — Kevin Cunningham
(74) *Attorney, Agent, or Firm* — Alan A. R. Cooper; Frederick J. Telecky, Jr.

(57) ABSTRACT

A method for determining an initial alignment for a frame of input data is provided. A frame for the input data is set, and the frame is synchronized. Specifically, a syndrome check of the frame is performed using a first predetermined number of bits, and a slip of a second predetermined number of bits is requested following the syndrome check. Evaluation of the syndrome check to determine whether the frame is aligned can then be performed in parallel with the slipping. The evaluation and slipping can then be repeated if the frame is misaligned. When the frame is aligned, a lock condition can be indicated, and the slip performed in parallel with the evaluation indicating that the frame is aligned can be deasserted. In addition, when the frame is aligned, error correction on the frame can be performed, and the error corrected frame can be formatted.

20 Claims, 3 Drawing Sheets

FORWARD ERROR CORRECTION DECODER

TECHNICAL FIELD

The invention relates generally to a decoder and, more particularly, to a forward error correction (FEC) decoder.

BACKGROUND

Turning to FIG. 1, an example of a conventional system 100 can be seen. In this system 100, hosts 102-1 to 102-N (which can be; for example, a computer, router, or switch) are able to communicate with one another over communications medium 112 (which can; for example, be an optical fiber, backplane, or twisted pair) through network interfaces 104-1 to 104-N. In this example, the network interfaces 104-1 to 104-N employ Ethernet over Electrical Backplanes and, more specifically, 10 GBase-KR. A description of 10 GBase-KR can be found in the Institute of Electrical and Electronics Engineers (IEEE) standard 802.3-2008 (which is dated Dec. 26, 2008 and which is incorporated by reference herein for all purposes). These network interfaces 104-1 to 104-N employ media access control (MAC) circuits 106-1 to 106-N that communicate with physical transceivers (PHYs) 110-1 to 110-N via media independent interfaces (MIIs) 108-1 to 108-N (which can typically have half-duplex or full-duplex operation). Each of which is described in IEEE standard 802.3-2008.

Of interest here, however, are PHYs 110-1 to 110-N, and, as can be seen in greater detail in FIG. 2, PHYs 110-1 to 110-N (hereinafter PHY 110), PHY 110 employs several sublayers. This PHY 110 can be an independent integrated circuit (IC) or can be integrated with a MAC circuit (i.e., MAC circuit 106-1) and an MII 108. As shown, the PHY 110 is generally comprised of physical medium dependant (PMD) sublayer logic 212; physical medium attachment (PMA) sublayer logic 210, forward error correction (FEC) sublayer logic 204, and physical coding (PCS) sublayer logic 202. These sublayer logic circuits 202, 204, 210, and 212 interact with one another to provide communications between MII 108 and communications medium 112. For transmission, the FEC sublayer logic 204 employs an encoder 206 as described in IEEE standard 802.3-2008, clause 74, and, for reception, the FEC sublayer logic 204 employs a decoder 308 as described in IEEE standard 802.3-2008, clause 74.

Looking specifically to decoder 208 (which can be seen in greater detail in FIG. 3), it is able to perform block synchronization and error correction. As shown, input data IN is provided from the PMA sublayer logic 210 to framer 304, and, typically, this input data IN is comprised of frames of data which can be 2112 bits (i.e., 66 bits over 32 cycles) that can include a set of parity bits (i.e., 32 bits). In operation, the framer 304 receives two frames worth of bits (i.e., 4224 bits) or more as the input data IN and selects a portion of the received input data as a frame. The pseudorandom number generator 302 and combiner (which can generally function as a descrambler) descramble the frame using a (for example) 2112-bit pseudonoise sequence. Based on the descrambled signal, the syndrome generator 306 is able to perform a syndrome check using, for example, the last 32-bits at the end of the frame. The syndrome check results SYND are then forwarded to the lock state machine 312, which can determine whether the check is correct. When correct, the frame (which was selected by the framer 304) is aligned, and the lock state machine 312 indicates a frame lock with lock signal LK so that the error correction circuit 310 can perform error correction on the words (i.e., 66-bit words) stored in the first-in-first-out (FIFO) memory 308. The formatter 314 can then format the error corrected words to generate output data OUT and output synchronization headers SYNC as an output frame (which, for example can be comprised of 32 66-bit words that each have two header bits and 64 data payload bits).

If, on the other hand, the lock state machine 312 determines that the syndrome check results SYND are incorrect, further processing is performed. Specifically, the lock state machine 312 requests a "slip" with slip request signal RQST. Typically, the framer 304 slips or reorients the frame by one bit. Once the "slip" is complete, the framer 304 indicates this completion to the lock state machine 312 with signal DONE. The syndrome generator 306 can, again, perform a syndrome check. This process can then continue until the frame is aligned during initialization. Following initialization, the same process can be employed to maintain frame alignment during normal operation in accordance with IEEE standard 802.3-2008, clause 74.

One problem with this arrangement is latency during initialization. Specifically, there can be significant latency with the volume of data that the framer 304 acquires, and there can be significant latency with respect to the handshaking between the lock state machine 312 and framer 304. Therefore, there is a need for an improved decoder.

Some examples of conventional systems are: U.S. Pat. No. 7,499,500; U.S. Pat. No. 7,873,892; U.S. Pat. No. 8,108,756; U.S. Patent Pre-Grant Publ. No. 2009/0276681; U.S. Patent Pre-Grant Publ. No. 2010/0095185; U.S. Patent Pre-Grant Publ. No. 2010/0229067; and "IEEE Standard 802.3ap-2007: Carrier Sense Multiple Access with Collision Detection (CSMA/CD) Access Method and Physical Layer Specifications, Amendment 4: Ethernet Operation over Electrical Backplanes," *IEEE-SA Standards Board*, Mar. 22, 2007; and IEEE Standard 802.3-2008 sections 1-5, Dec. 26, 2008 (which has been incorporated by reference above).

SUMMARY

In accordance with the present invention, a method is provided. The method comprises: receiving input data; setting a frame for the input data; synchronizing the frame by: performing a syndrome check of the frame using a first predetermined number of bits; requesting a slip of a second predetermined number of bits following the step of performing; evaluating the syndrome check in parallel with the step of requesting to determine whether the frame is aligned; repeating the steps of performing and evaluating if the frame is misaligned; and when the frame is aligned, indicating a lock condition; and when the frame is aligned, deasserting the slip performed in parallel with the evaluation indicating that the frame is aligned; performing error correction on the frame that is aligned to generate an error corrected frame; and formatting the error corrected frame.

In accordance with the present invention, the method further comprises descrambling the frame following the step of setting.

In accordance with the present invention, the step of formatting further comprises generating output data; and generating a header that corresponds to the output data.

In accordance with the present invention, the step of descrambling further comprises descrambling the frame with a pseudo-noise sequence.

In accordance with the present invention, the step of receiving further comprises receiving the input data from a physical medium attachment (PMA) sublayer, and the method further comprises outputting the output data and header to a physical coding (PCS) sublayer.

In accordance with the present invention, the first predetermined number of bits is 32, and the second predetermined number of bits is 1.

In accordance with the present invention, an apparatus is provided. The apparatus comprises: physical medium dependant (PMD) sublayer logic that is configured to communicate with a communications medium; PMA sublayer logic that is coupled to the PMD logic; PCS sublayer logic that is configured to communicate with an interface; and forward error correction (FEC) sublayer logic having: an encoder that is coupled to the PMA sublayer logic; and a decoder having: a framer that is coupled to the PMA sublayer logic so as to receive input data, wherein the framer is configured to set a frame for the input data; a syndrome generator that is coupled to the framer, wherein the syndrome generator is configured to perform a syndrome check of the frame using a first predetermined number of bits, and wherein the syndrome generator is configured to request a slip of a second predetermined number of bits by the framer following the syndrome check; a lock state machine that is coupled to the syndrome generator and the framer, wherein the lock state machine is configured to evaluate the syndrome check in parallel with the slip to determine whether the frame is aligned, and wherein the lock state machine is configured to indicate a lock condition when the frame is aligned, and wherein the lock state machine is configured to request deassertion of the slip performed in parallel with the evaluation indicating that the frame is aligned; an error correction circuit that is coupled to the lock state machine and the syndrome generator; and a formatter that is coupled to the error correction circuit and the PCS sublayer logic.

In accordance with the present invention, the FEC sublayer logic further comprises a descrambling circuit that is coupled between the framer and the syndrome generator.

In accordance with the present invention, the descrambling circuit further comprises a pseudorandom number generator; and a combiner that is coupled between the framer and the syndrome generator and that is coupled to the pseudorandom number generator.

In accordance with the present invention, the FEC sublayer logic further comprises a first-in-first-out (FIFO) memory coupled between the syndrome generator and the error correction circuit.

In accordance with the present invention, the formatter is a 64b/66b formatter.

In accordance with the present invention, the pseudorandom number generator is configured to generate a pseudo-noise sequence that is 2112 bits in length.

In accordance with the present invention, an apparatus is provided. The apparatus comprises: a communications medium; a plurality of network interfaces, wherein each network interface includes: a media access control (MAC) circuit; a media independent interface (MII) that is coupled to the MAC circuit; and a physical transceiver (PHY) having: PMD sublayer logic that is configured to communicate with a communications medium; PMA sublayer logic that is coupled to the PMD logic; PCS sublayer logic that is coupled to the MII; and FEC sublayer logic having: an encoder that is coupled to the PMA sublayer logic; and a decoder having: a framer that is coupled to the PMA sublayer logic so as to receive input data, wherein the framer is configured to set a frame for the input data; a syndrome generator that is coupled to the framer, wherein the syndrome generator is configured to perform a syndrome check of the frame using a first predetermined number of bits, and wherein the syndrome generator is configured to request a slip of a second predetermined number of bits by the framer following the syndrome check; a lock state machine that is coupled to the syndrome generator and the framer, wherein the lock state machine is configured to evaluate the syndrome check in parallel with the slip to determine whether the frame is aligned, and wherein the lock state machine is configured to indicate a lock condition when the frame is aligned, and wherein the lock state machine is configured to request deassertion of the slip performed in parallel with the evaluation indicating that the frame is aligned; an error correction circuit that is coupled to the lock state machine and the syndrome generator; and a formatter that is coupled to the error correction circuit and the PCS sublayer logic.

In accordance with the present invention, the apparatus further comprises a plurality of hosts, wherein each host is coupled to at least one of the MAC circuits In accordance with the present invention, the first predetermined number of bits is 32, the second predetermined number of bits is 1, and wherein the pseudorandom number generator is configured to generate a pseudo-noise sequence that is 2112 bits in length.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
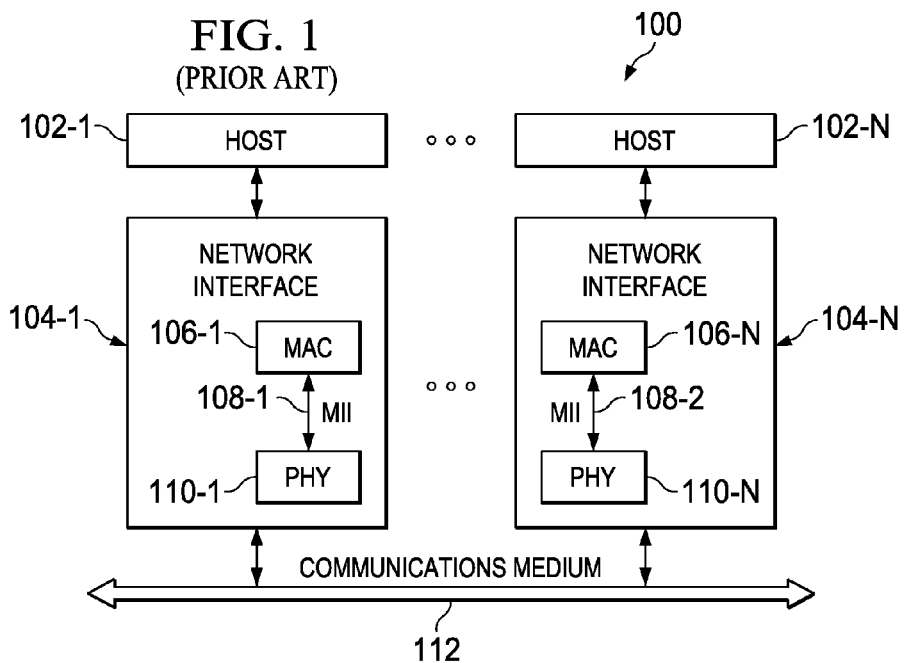
FIG. 1 is a diagram of an example of a conventional system.
Figure 2:
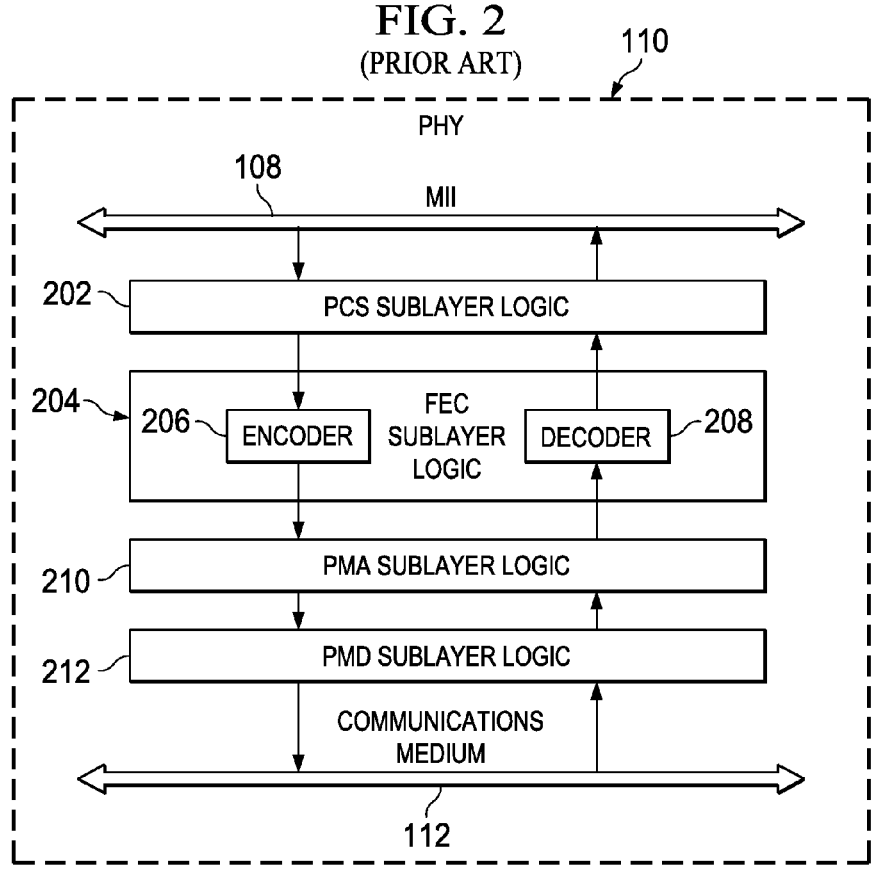
FIG. 2 is a diagram of an example of a PHY of FIG. 1.
Figure 3:
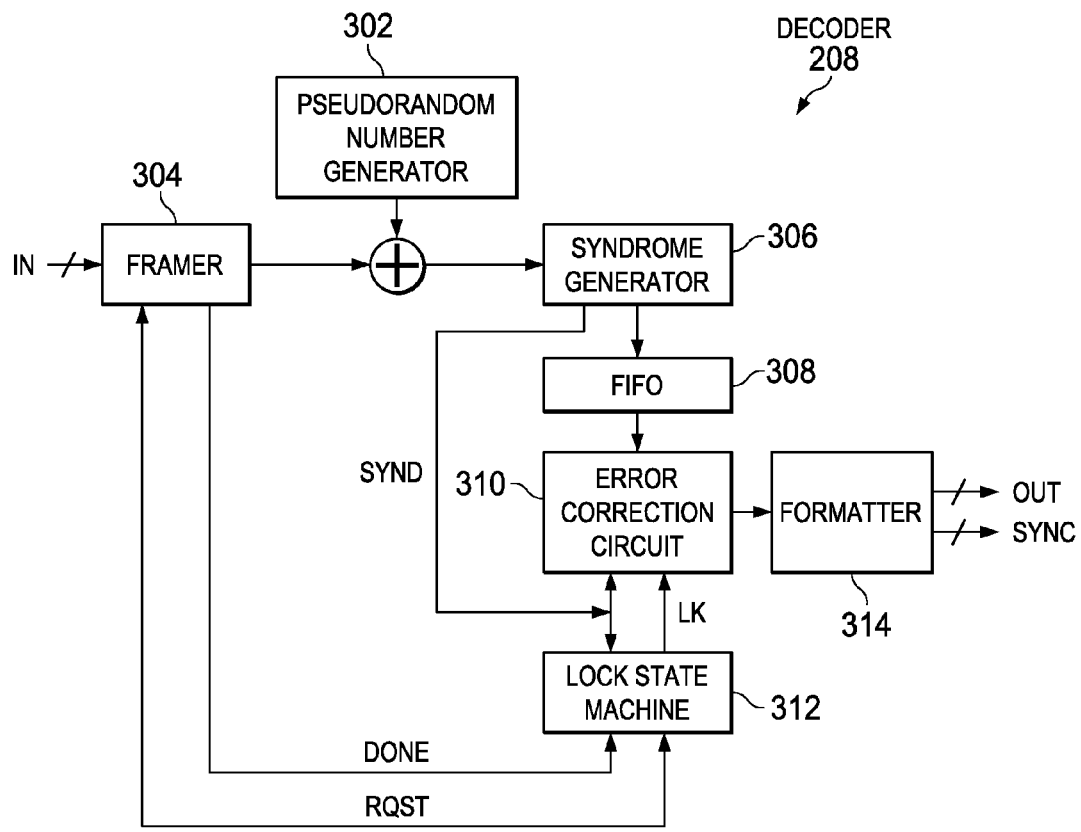
FIG. 3 is a diagram of a decoder of FIG. 2.

Refer now to the drawings wherein depicted elements are, for the sake of clarity, not necessarily shown to scale and wherein like or similar elements are designated by the same reference numeral through the several views.

Figure 4:
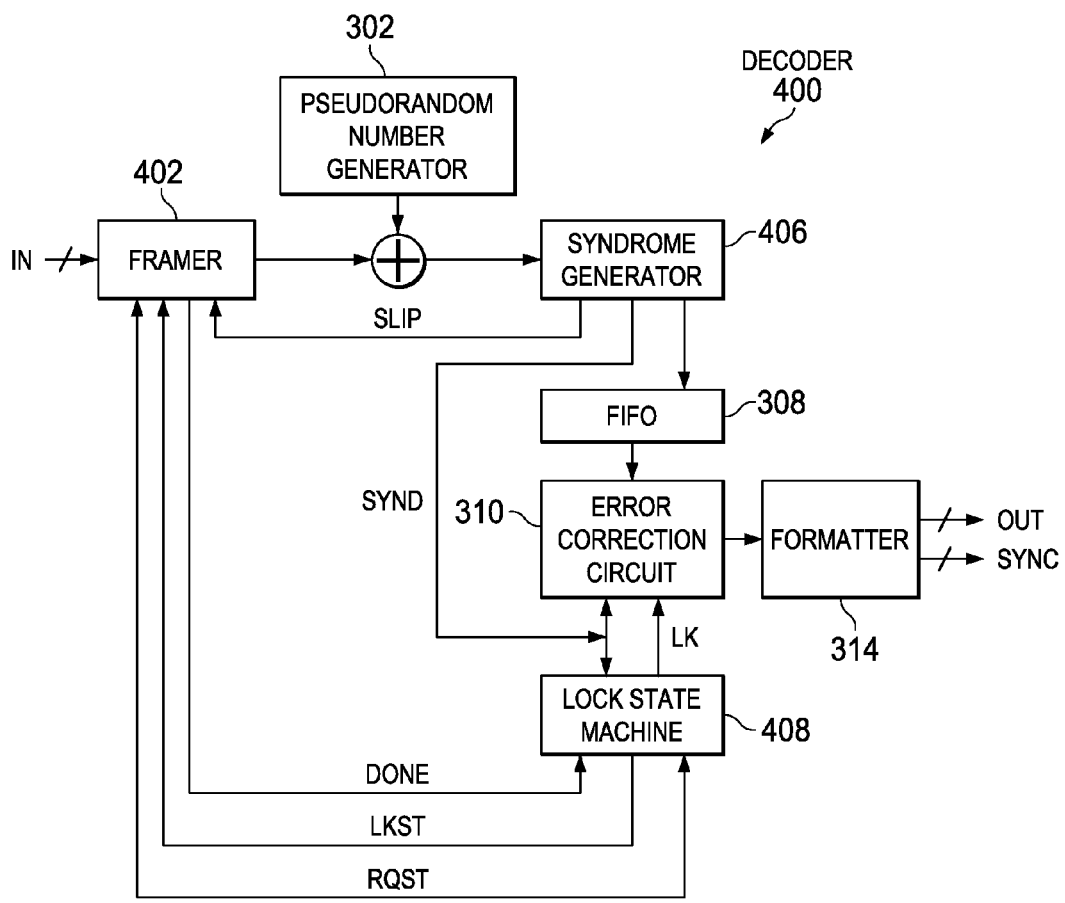
FIG. 4 is a diagram of a decoder in accordance with the present invention.

Turning to FIG. 4, an example of a decoder 400 in accordance with the present invention can be seen, which can replace decoder 208. This decoder 400 operates in the same manner as decoder 208 during normal operation (using the signals RQST and DONE to provide adjustments) as shown and described in IEEE standard 802.3-2008, clause 74, but, during initialization (where the latency can be significant), the handshaking between the framer 402 and lock state machine 408 can be eliminated. To differentiate between normal operation and initialization (which decoder 208 is unable to do), the lock state machine 408 provides a lock state signal LKST to framer 402.

During initialization and similar to decoder 208, the framer 402 of decoder 400 is able to receive frames of input data IN. A frame, for example, can be comprised of 32 words that each have 66-bits, and, for this example frame, the first 31 words of the frame have one header bits and 64 data payload bits. The last word of this example frame can have a 34 bit data payload and 32 parity bits. The descrambler (which generally comprises the combiner and pseudorandom number generator 302) can then descramble the frame using, for example, a 2112-bit pseudonoise sequence (which is shown and described in section 74.7.4.4.1 of IEEE standard 802.3-2008). The syndrome generator 406 can then perform a syndrome check. The syndrome check results SYND are provided to the lock state machine 408, and the syndrome generator 402 requests a slip using the slip request signal SLIP. Thus, the framer 402 can perform a "slip" (i.e., a 1-bit slip) in parallel with the evaluation of the syndrome check results SYND by the lock state machine 408. If the lock state machine 408 determines that the frame is aligned, the lock state machine 408 indicates a frame lock with lock signal LK and changes the state of the lock state signal LKST. At this point, the framer 402 can deassert the previously request "slip" from syndrome generator 406, and the error correction circuit 310 can perform error correction on the words (i.e., 66-bit words) stored in the first-in-first-out (FIFO) memory 308. The formatter 304 (which can be a 64b/66b formatter as described in IEEE standard 802.3-2008, clause 74) can then format the error corrected words to generate output data OUT and output synchronization headers SYNC as an output frame (which, for example can be comprised of 32 66-bit words that each have two header bits and 64 data payload bits). When the lock state machine 312 determines that the frame is misaligned, the lock state machine 408 can promptly begin evaluating the next syndrome check results SYND in parallel with another "slip."

As a result, of using the configuration shown with respect to decoder 408, several advantages can be realized. Decoder 408 expressly allows the framer 402 to substantially continuously perform "slipping" without any latency (as was present with decoder 208), and decoder 400 can test every bit boundary to determine the start of a frame. Also, because the framer 402 can substantially continuously perform "slipping," two frames worth of input data IN are not required (as was the case with decoder 208).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
   receiving input data;
   setting a frame for the input data;
   synchronizing the frame by:
      performing a syndrome check of the frame using a first predetermined number of bits;
      requesting a slip of a second predetermined number of bits following the step of performing the syndrome check, wherein the requesting of the slip occurs irrespective of a result of the syndrome check;
      evaluating the syndrome check in parallel with the step of requesting the slip to determine whether the frame is aligned;
      repeating the steps of performing and evaluating if the frame is misaligned; and
      when the frame is aligned, indicating a lock condition; and
      when the frame is aligned, deasserting the slip performed in parallel with the evaluation indicating that the frame is aligned;
   performing error correction on the frame that is aligned to generate an error corrected frame; and
   formatting the error corrected frame.

2. The method of claim 1, wherein the method further comprises descrambling the frame following the step of setting.

3. The method of claim 2, wherein the step of formatting further comprises:
   generating output data; and
   generating a header that corresponds to the output data.

4. The method of claim 3, wherein the step of descrambling further comprises descrambling the frame with a pseudo-noise sequence.

5. The method of claim 4, wherein the step of receiving further comprises receiving the input data from a physical medium attachment (PMA) sublayer, and wherein the method further comprises outputting the output data and header to a physical coding (PCS) sublayer.

6. The method of claim 5, wherein the first predetermined number of bits is 32, and wherein the second predetermined number of bits is 1.

7. An apparatus comprising:
   physical medium dependant (PMD) sublayer logic that is configured to communicate with a communications medium;
   PMA sublayer logic that is coupled to the PMD logic;
   PCS sublayer logic that is configured to communicate with an interface; and
   forward error correction (FEC) sublayer logic having:
      an encoder that is coupled to the PMA sublayer logic; and
      a decoder having:
         a framer that is coupled to the PMA sublayer logic so as to receive input data, wherein the framer is configured to set a frame for the input data;
         a syndrome generator that is coupled to the framer, wherein the syndrome generator is configured to perform a syndrome check of the frame using a first predetermined number of bits, and wherein the syndrome generator is configured to request a slip of a second predetermined number of bits by the framer following the syndrome check, wherein the requesting of the slip occurs irrespective of a result of the syndrome check;
         a lock state machine that is coupled to the syndrome generator and the framer, wherein the lock state machine is configured to evaluate the syndrome check in parallel with the slip to determine whether the frame is aligned, and wherein the lock state machine is configured to indicate a lock condition when the frame is aligned, and wherein the lock state machine is configured to request deassertion of the slip performed in parallel with the evaluation indicating that the frame is aligned;
         an error correction circuit that is coupled to the lock state machine and the syndrome generator; and
         a formatter that is coupled to the error correction circuit and the PCS sublayer logic.

8. The apparatus of claim 7, wherein the FEC sublayer logic further comprises a descrambling circuit that is coupled between the framer and the syndrome generator.

9. The apparatus of claim 8, wherein the descrambling circuit further comprises:
   a pseudorandom number generator; and
   a combiner that is coupled between the framer and the syndrome generator and that is coupled to the pseudorandom number generator.

10. The apparatus of claim 9, wherein the FEC sublayer logic further comprises a first-in-first-out (FIFO) memory coupled between the syndrome generator and the error correction circuit.

11. The apparatus of claim 10, wherein the formatter is a 64b/66b formatter.

12. The apparatus of claim 11, wherein the first predetermined number of bits is 32, and wherein the second predetermined number of bits is 1.

13. The apparatus of claim 12, wherein the pseudorandom number generator is configured to generate a pseudo-noise sequence that is 2112 bits in length.

14. An apparatus comprising:
- a communications medium;
- a plurality of network interfaces, wherein each network interface includes:
  - a media access control (MAC) circuit;
  - a media independent interface (MII) that is coupled to the MAC circuit; and
  - a physical transceiver (PHY) having:
    - PMD sublayer logic that is configured to communicate with a communications medium;
    - PMA sublayer logic that is coupled to the PMD logic;
    - PCS sublayer logic that is coupled to the MII; and
    - FEC sublayer logic having:
      - an encoder that is coupled to the PMA sublayer logic; and
      - a decoder having:
        - a framer that is coupled to the PMA sublayer logic so as to receive input data, wherein the framer is configured to set a frame for the input data;
        - a syndrome generator that is coupled to the framer, wherein the syndrome generator is configured to perform a syndrome check of the frame using a first predetermined number of bits, and wherein the syndrome generator is configured to request a slip of a second predetermined number of bits by the framer following the syndrome check, wherein the requesting of the slip occurs irrespective of a result of the syndrome check;
        - a lock state machine that is coupled to the syndrome generator and the framer, wherein the lock state machine is configured to evaluate the syndrome check in parallel with the slip to determine whether the frame is aligned, and wherein the lock state machine is configured to indicate a lock condition when the frame is aligned, and wherein the lock state machine is configured to request deassertion of the slip performed in parallel with the evaluation indicating that the frame is aligned;
        - an error correction circuit that is coupled to the lock state machine and the syndrome generator; and
        - a formatter that is coupled to the error correction circuit and the PCS sublayer logic.

15. The apparatus of claim 14, wherein the FEC sublayer logic further comprises a descrambling circuit that is coupled between the framer and the syndrome generator.

16. The apparatus of claim 15, wherein the descrambling circuit further comprises:
- a pseudorandom number generator; and
- a combiner that is coupled between the framer and the syndrome generator and that is coupled to the pseudorandom number generator.

17. The apparatus of claim 16, wherein the FEC sublayer logic further comprises a FIFO memory coupled between the syndrome generator and the error correction circuit.

18. The apparatus of claim 17, wherein the apparatus further comprises a plurality of hosts, wherein each host is coupled to at least one of the MAC circuits.

19. The apparatus of claim 18, wherein the formatter is a 64b/66b formatter.

20. The apparatus of claim 19, wherein the first predetermined number of bits is 32, and wherein the second predetermined number of bits is 1, and wherein the pseudorandom number generator is configured to generate a pseudo-noise sequence that is 2112 bits in length.

* * * * *